United States Patent
Jegal et al.

(10) Patent No.: US 11,065,557 B2
(45) Date of Patent: Jul. 20, 2021

(54) MICRO DEVICE FOR SOLID PHASE EXTRACTION

(71) Applicant: LG Chem, Ltd., Seoul (KR)

(72) Inventors: Seonyoung Jegal, Daejeon (KR); Dae Hun Kim, Daejeon (KR); Byoung Hyoun Kim, Daejeon (KR); Yeu Young Youn, Daejeon (KR); Kyoungjoo Jin, Daejeon (KR); Jun Won Choi, Daejeon (KR); Su Youn Han, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/631,341

(22) PCT Filed: Oct. 12, 2018

(86) PCT No.: PCT/KR2018/012002
§ 371 (c)(1),
(2) Date: Jan. 15, 2020

(87) PCT Pub. No.: WO2019/098532
PCT Pub. Date: May 23, 2019

(65) Prior Publication Data
US 2020/0215455 A1    Jul. 9, 2020

(30) Foreign Application Priority Data
Nov. 17, 2017 (KR) .......................... 10-2017-0153518

(51) Int. Cl.
*B01D 11/02* (2006.01)
*B01L 3/00* (2006.01)
(Continued)

(52) U.S. Cl.
CPC ............ *B01D 11/02* (2013.01); *B01L 3/5027* (2013.01); *G01N 1/405* (2013.01); *G01N 30/6095* (2013.01); *B01L 2300/0803* (2013.01)

(58) Field of Classification Search
CPC . B01D 11/02; B01D 11/0219; B01D 11/0288; B01D 11/0215; B01L 3/5027;
(Continued)

(56) References Cited

U.S. PATENT DOCUMENTS 6,074,827 A * 6/2000 Nelson ................ B01L 3/50273
435/6.1
6,588,255 B2  7/2003 Pawliszyn
(Continued)

FOREIGN PATENT DOCUMENTS

CN    104083904 A    10/2014
CN    106124645 A    11/2016
(Continued)

OTHER PUBLICATIONS

Boonjob et al., "An Overview about Recent Advances of Micro-Solid Phase Extraction in Flow Based Techniques," Austin Journal of Analytical and Pharmaceutical Chemistry, vol. 1, Issue 2, Jul. 2014, pp. 1-6.
(Continued)

*Primary Examiner* — Joseph W Drodge
(74) *Attorney, Agent, or Firm* — Lerner, David, Littenberg, Krumholz & Mentlik, LLP

(57) ABSTRACT

The present invention relates to a micro device for solid phase extraction and more particularly provides a micro device which is configured to perform solid phase extraction by injecting a filler and a solvent and producing a uniform flow of the solvent.

8 Claims, 4 Drawing Sheets

(51) Int. Cl.
*G01N 1/40* (2006.01)
*G01N 30/60* (2006.01)

(58) Field of Classification Search
CPC ....... B01L 3/502753; B01L 2200/0631; B01L 2200/0668; B01L 2300/0816; B01L 2400/0487; B01L 2400/086; B01L 3/502746; B01L 2200/0647; B01L 2300/0803; G01N 30/6091; G01N 30/6095; G01N 1/40; G01N 2001/4061; G01N 2030/009; G01N 1/405
USPC .................................................. 210/511, 634
See application file for complete search history.

(56) References Cited

U.S. PATENT DOCUMENTS

| | | | |
|---|---|---|---|
| 9,897,596 | B2 | 2/2018 | Kellogg et al. |
| 2003/0217923 | A1 | 11/2003 | Harrison et al. |
| 2004/0223880 | A1* | 11/2004 | Gjerde ..................... G01N 1/40 422/70 |
| 2005/0255014 | A1 | 11/2005 | Glover et al. |
| 2007/0248958 | A1* | 10/2007 | Jovanovich ......... B01L 3/50273 435/6.19 |
| 2008/0014576 | A1* | 1/2008 | Jovanovich ......... B01F 11/0071 435/5 |
| 2010/0111771 | A1* | 5/2010 | Gjerde ..................... G01N 1/40 422/400 |
| 2011/0039303 | A1* | 2/2011 | Jovanovich ............. B01L 7/525 435/91.2 |
| 2011/0133077 | A1* | 6/2011 | Henion ................... G01N 1/405 250/288 |
| 2014/0242721 | A1 | 8/2014 | Kellogg et al. |
| 2015/0011016 | A1* | 1/2015 | Brewer ................. B01L 3/0275 436/501 |
| 2015/0051383 | A1* | 2/2015 | Doucette ................ B01L 3/502 530/419 |
| 2015/0321193 | A1 | 11/2015 | Sprague et al. |
| 2015/0338317 | A1 | 11/2015 | Dimson et al. |
| 2016/0252435 | A1 | 9/2016 | Sasano |
| 2018/0074039 | A1* | 3/2018 | Soper ....................... C12M 1/40 |
| 2019/0217283 | A1 | 7/2019 | Glover |
| 2020/0376410 | A1* | 12/2020 | Choi ................. B01L 3/502753 |

FOREIGN PATENT DOCUMENTS

| | | |
|---|---|---|
| JP | 2003159526 A | 6/2003 |
| JP | 2003521711 A | 7/2003 |
| JP | 2005526974 A | 9/2005 |
| JP | 2007155519 A | 6/2007 |
| JP | 2007170903 A | 7/2007 |
| JP | 2008513022 A | 5/2008 |
| JP | 2008545527 A | 12/2008 |
| JP | 2010256225 A | 11/2010 |
| JP | 5313032 B2 | 10/2013 |
| JP | 2014518374 A | 7/2014 |
| JP | 2015078956 A | 4/2015 |
| KR | 20080033178 A | 4/2008 |
| KR | 20140060263 A | 5/2014 |
| KR | 20150096788 A | 8/2015 |
| WO | 9820352 A2 | 5/1998 |
| WO | 2010093694 A1 | 8/2010 |
| WO | 2014055898 A1 | 4/2014 |

OTHER PUBLICATIONS

International Search Report from Application No. PCT/KR2018/012002 dated Apr. 16, 2019, 3 pages.
Tuomikoski et al., "Design and fabrication of integrated solid-phase extraction-zone electrophoresis microchip," Journal of Chromatography A, vol. 1111, Issue 2, Apr. 2006, pp. 258-266.
Extended European Search Report including Written Opinion for Application No. EP18879913.4, dated Dec. 2, 2020, pp. 1-8.
Search Report from First Chinese Office Action for Application No. 201880035835.7 dated Mar. 5, 2021; 3 pages.

* cited by examiner

[Fig. 1a]
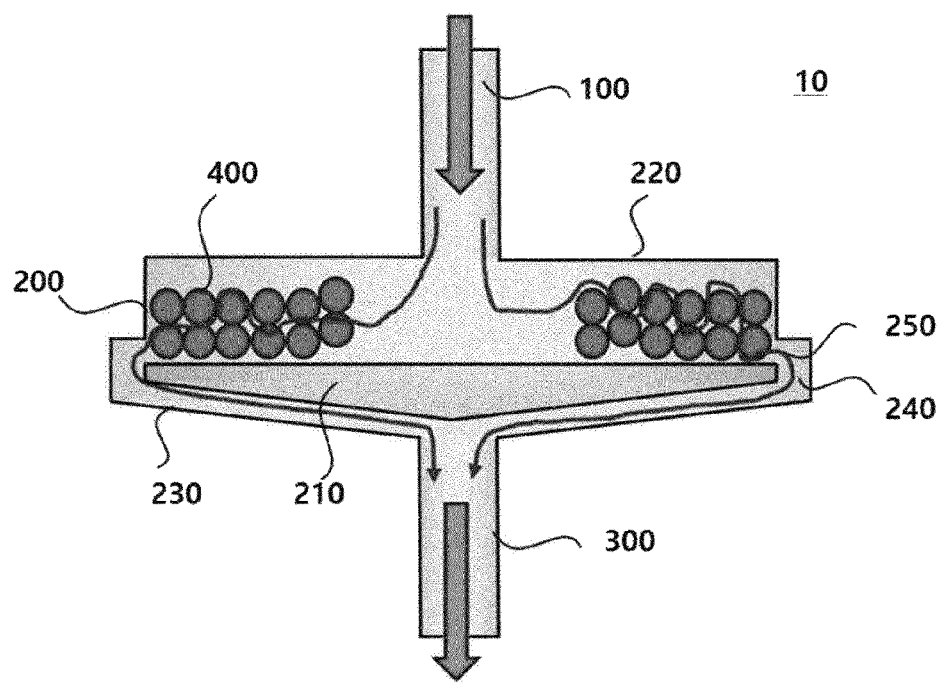

[Fig. 1b]
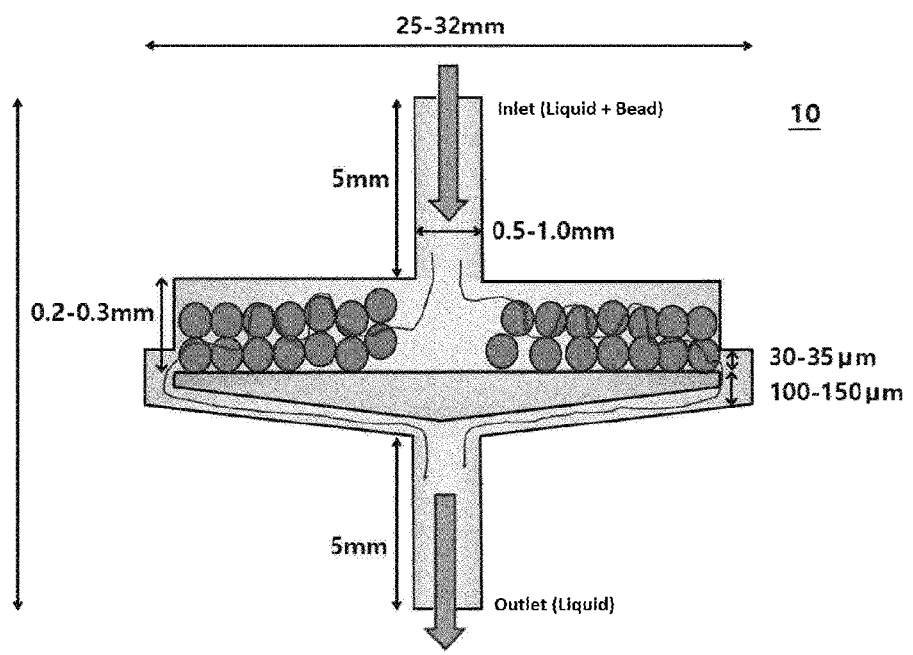

[Fig. 2]
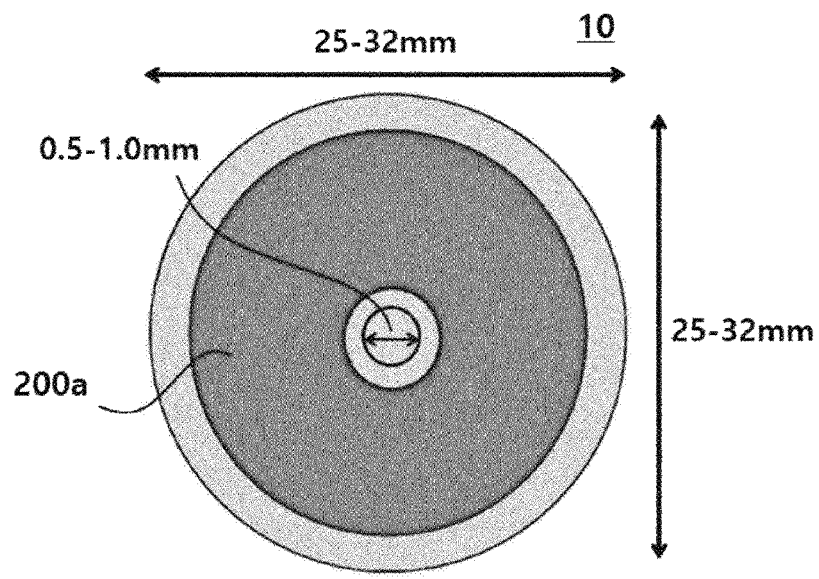
[Fig. 3]
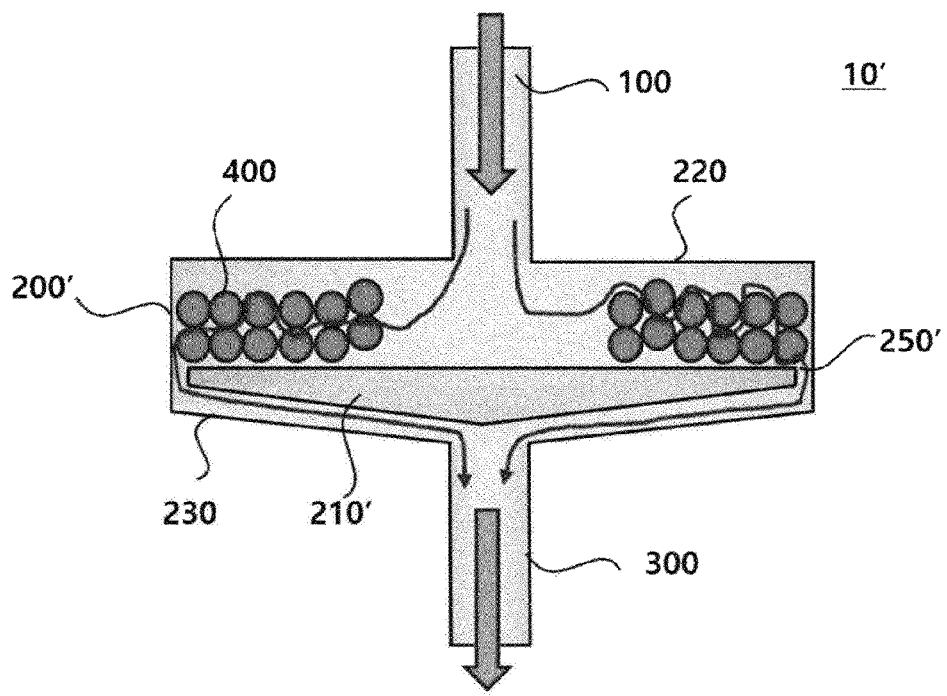

[Fig. 4a]
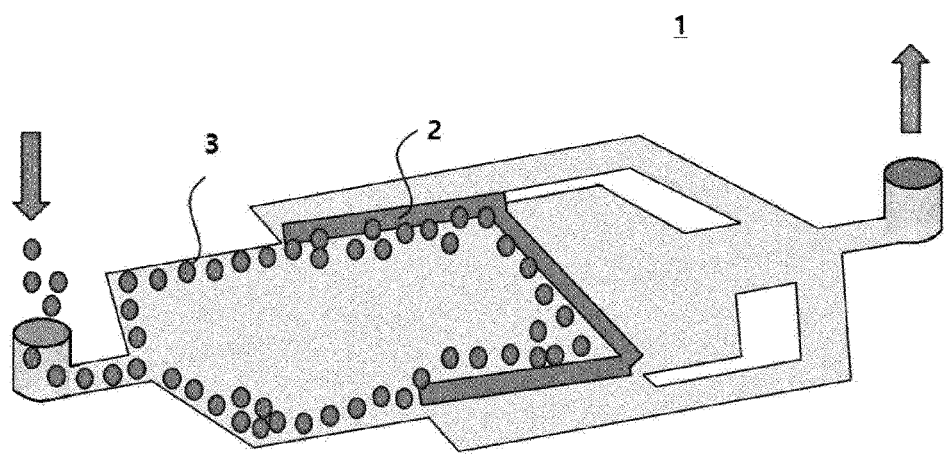
[Fig. 4b]
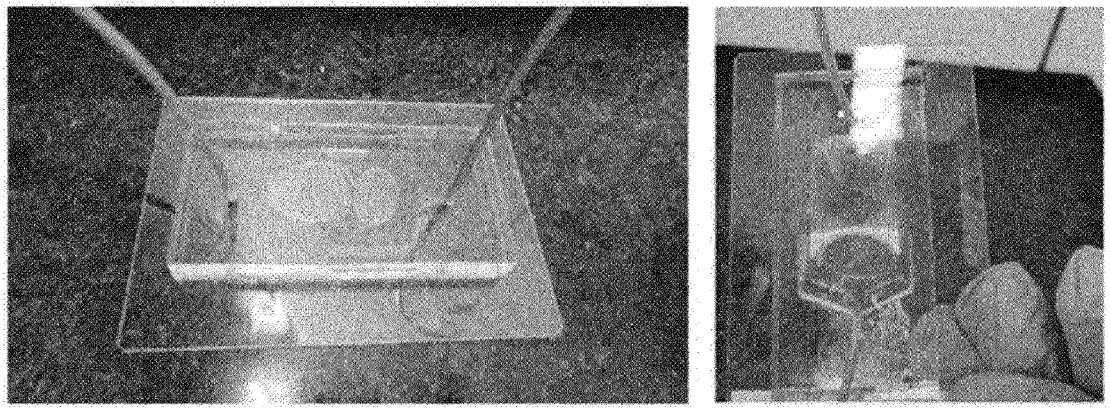

MICRO DEVICE FOR SOLID PHASE EXTRACTION

BACKGROUND OF THE INVENTION

1. Field of the Invention

This application is a national phase entry under 35 U.S.C. § 371 of International Application No. PCT/KR2018/012002, filed on Oct. 12, 2018, published in Korean, which claims priority from Korean Patent Application No. 10-2017-0153518, filed on Nov. 17, 2017, the entire disclosures of which are hereby incorporated herein by reference.

The present invention relates to a micro device for solid phase extraction, and more particularly, to a micro device capable of performing solid phase extraction by injecting a filler and a solvent.

2. Description of the Related Art

Solid phase extraction is a method in which a target material is adsorbed using a filler having a specific property, such as beads, and purified and concentrated using a solvent to perform a pretreatment. In this case, a device for packing the filler is required. A micro device having a small size is used in order to increase a recovery rate and shorten a pretreatment time. In addition, a micro device is used to detect trace amounts of materials. The use of a micro device has advantages of being environmentally friendly since it can reduce solvent consumption.

The shape of the conventional micro device for solid phase extraction 1 is as shown in FIGS. 4a and 4b. There is provided a dam 2 inside the micro device 1 so that beads 3 could not pass through but only the fluid flows. At this time, as the flow path is reduced due to packing of beads in the rear portion of the dam, differential pressure is generated. The smaller the porosity, the greater the differential pressure. In the conventional micro device of FIGS. 4a and 4b, a dam is installed on the left side, the right side, and the center of the device. Accordingly, a larger amount of fluid flows in the left and right directions, in which filling distance of the beads is relatively short. As a result, there is generated a non-uniform flow distribution of the fluid.

SUMMARY OF THE INVENTION

In order to solve the non-uniform flow distribution of the fluid in the conventional micro device for solid phase extraction, there is a need for a new type of micro device for solid phase extraction capable of realizing uniform extraction by flowing a fluid at a uniform flow rate.

The micro device for solid phase extraction according to the present invention comprises:
an inlet for injecting a solvent and a filler;
an outlet for discharging the solvent; and
a dam-forming portion located between the inlet and the outlet, the dam-forming portion including a dam that allows only the solvent to flow through but the filler not to pass through,
wherein each of the dam-forming portion and the dam has a circular cross section with respect to a central axis in a direction in which the inlet extends, the cross section being perpendicular to the central axis, and wherein the filler is filled in the form of disk with respect to the central axis in the dam-forming portion.

In addition, in the micro device for solid phase extraction according to the present invention, each of the inlet, the outlet, the dam-forming portion, and the dam has a circular cross section with respect to a central axis in a direction in which the inlet extends, the cross section being perpendicular to the central axis, and each of the diameter of the inlet and the diameter of the outlet may be smaller than the diameter of the dam-forming portion.

In addition, the micro device for solid phase extraction has a first end portion connected to the inlet and a second end portion connected to the outlet which are both ends of the dam-forming portion, wherein the dam may be located closer to the second end portion than the first end portion, and the dam may be located by a predetermined distance away from the second end portion.

In addition, in the micro device for solid phase extraction, each of the shape of the second end portion and the shape of the surface facing the second end portion of the dam may have a shape protruding toward the outlet.

In addition, in the micro device for solid phase extraction, the shape of the second end portion and the shape of the surface facing the second end portion of the dam may be a conical shape.

In addition, in the micro device for solid phase extraction, the filler may be beads.

In addition, in the micro device for solid phase extraction, the total diameter of the micro device may be 25 mm to 32 mm and the total length of the micro device may be 10 mm.

In addition, in the micro device for solid phase extraction, the diameter of the filler is from 35 μm to 60 μm,
the diameter of the inlet is 0.5 mm to 10 mm and the length of the inlet is 5 mm,
the diameter of the outlet is 0.5 mm to 10 mm and the length of the outlet is 5 mm,
the length from the first end portion of the dam-forming portion to the surface facing the first end portion of the dam is 0.2 mm to 0.3 mm,
the length from the surface facing the first end portion of the dam to the second end portion of the dam-forming portion is 100 μm to 150 μm, and
the length of the dam is 30 μm to 35 μm.

Effect of the Invention

According to the micro device for solid phase extraction of the present invention, it is advantageous that a uniform fluid flow is formed along the central axis of the micro device for solid phase extraction, thereby realizing uniform solid phase extraction.

BRIEF DESCRIPTION OF THE DRAWINGS

FIGS. 1a and 1b show a front view of a micro device for solid phase extraction according to an embodiment of the present invention.

FIG. 2 shows a top view of a micro device for solid phase extraction of FIG. 1a.

FIG. 3 shows a front view of a micro device for solid phase extraction according to other embodiment of the present invention.

FIGS. 4a and 4b show a perspective view of a micro device for solid phase extraction according to the prior art and show an experimental example of a flow of a solvent and beads.

DETAILED DESCRIPTION OF THE INVENTION

The micro device for solid phase extraction according to the present invention comprises:

an inlet for injecting a solvent and a filler;

an outlet for discharging the solvent; and a dam-forming portion located between the inlet and the outlet, the dam-forming portion including a dam that allows only the solvent to flow through but the filler not to pass through, wherein each of the dam-forming portion and the dam has a circular cross section with respect to a central axis in a direction in which the inlet extends, the cross section being perpendicular to the central axis, and wherein the filler is filled in the form of disk with respect to the central axis in the dam-forming portion.

In addition, in the micro device for solid phase extraction according to the present invention, each of the inlet, the outlet, the dam-forming portion, and the dam has a circular cross section with respect to a central axis in a direction in which the inlet extends, the cross section being perpendicular to the central axis, and each of the diameter of the inlet and the diameter of the outlet may be smaller than the diameter of the dam-forming portion.

In addition, the micro device for solid phase extraction has a first end portion connected to the inlet and a second end portion connected to the outlet which are both ends of the dam-forming portion, wherein the dam may be located closer to the second end portion than the first end portion, and the dam may be located by a predetermined distance away from the second end portion.

In addition, in the micro device for solid phase extraction, each of the shape of the second end portion and the shape of the surface facing the second end portion of the dam may have a shape protruding toward the outlet.

In addition, in the micro device for solid phase extraction, the shape of the second end portion and the shape of the surface facing the second end portion of the dam may be a conical shape.

In addition, in the micro device for solid phase extraction, the filler may be beads.

In addition, in the micro device for solid phase extraction, the total diameter of the micro device may be 25 mm to 32 mm and the total length of the micro device may be 10 mm.

In addition, in the micro device for solid phase extraction, the diameter of the filler is from 35 μm to 60 μm, the diameter of the inlet is 0.5 mm to 10 mm and the length of the inlet is 5 mm, the diameter of the outlet is 0.5 mm to 10 mm and the length of the outlet is 5 mm, the length from the first end portion of the dam-forming portion to the surface facing the first end portion of the dam is 0.2 mm to 0.3 mm, the length from the surface facing the first end portion of the dam to the second end portion of the dam-forming portion is 100 μm to 150 μm, and the length of the dam is 30 μm to 35 μm.

Hereinafter, the micro device for solid phase extraction according to the present invention will be described in detail. The accompanying drawings, which are included to provide a further understanding of the invention, illustrate embodiments of the invention and are not intended to limit the technical scope of the present invention.

In addition, the same or corresponding components will be denoted by the same reference numerals regardless of symbols, and redundant description thereof will be omitted. For convenience of explanation, the size and shape of each component shown may be exaggerated or reduced.

FIGS. 1a and 1b show a front view of a micro device for solid phase extraction 10 according to an embodiment of the present invention. The micro device for solid phase extraction 10 includes an inlet 100, a dam-forming portion 200, and an outlet 300. A filler 400 (e.g., beads) and a solvent are injected through the inlet 100 and the injected filler 400 and solvent move into the dam-forming portion 200 connected to the inlet 100. The filler 400 is filled in the rear of the dam 210 in the dam-forming portion 200, and the solvent is discharged through the outlet 300 connected to the dam-forming portion 200 via the side surface of the dam 210.

The dam-forming portion 200 of the micro device for solid phase extraction 10 according to the present invention has a shape of cylinder having a circular cross section (or disk having a predetermined length). The dam-forming portion 200 includes a dam 210 on the side of outlet 300. The dam 210 also has a shape of disk having a circular cross section. With respect to both ends of the dam-forming portion having a cylindrical shape, an end of the dam-forming portion 200 connected to the inlet 100 is referred to as a first end portion 220 and an end of the dam-forming portion 200 is connected to the outlet 300 is referred to as a second end portion 230. The dam 210 is located close to the second end portion 230 of the dam-forming portion 200 and the dam 210 is located by a predetermined distance away from the second end portion 230 so that the solvent can flow toward the outlet 300. However, the present invention is not limited to the above. For example, the dam 210 may be manufactured by a perforated plate having holes with a size smaller than that of the filler 400, or a mesh structure such that the filler 400 could not pass therethrough. In this case, the solvent may flow to the outlet 300 through the dam 210 as well as the side surface of the dam 210.

The second end portion 230 protrudes toward the outlet 300, and for example, may have a conical shape as shown in FIG. 1a, in order to minimize resistance due to the second end portion 230 when the solvent which passed by the dam 210 moves toward the outlet 300 in the dam-forming portion 200. The dam 210 may be in the form of disk as described above, but the front portion of the dam 210 may also have a conical shape, like the second end portion 230 having a conical shape, as shown in FIG. 1a.

In addition, as shown in FIG. 1a, in case that the diameter of the dam-forming portion 200 is equal to the diameter of the dam 210, there is further provided a protruded portion 240 in which a side surface surrounding the portion where the dam 210 is located in the dam-forming portion 200 is further protruded so that the protruded portion 240 allows the solvent to move between the side surface of the dam 210 and the inner surface of the dam-forming portion 200. In this case, the diameter of the second end portion 230 of the dam-forming portion 200 may be larger than the diameter of the first end portion 220 of the dam-forming portion 200. As shown by a flow line of the solvent in FIG. 1a, the solvent may pass between the fillers 400, pass by the protruded portion 240 of the dam-forming portion 200 and pass by a space between the second end portion 230 of the dam-forming portion 200 and the dam 210, and then move toward the outlet 300.

A solvent inlet 250, which is the inlet of the space through which the solvent flows between the side surface of the dam 210 and the inner surface of the dam-forming portion 200, has a width smaller than the diameter of the filler 400.

FIG. 3 shows a front view of a micro device for solid phase extraction 10' according to other embodiment of the present invention, in which the micro device for solid phase extraction of FIG. 1a is partially modified. As shown in FIG. 3, in case that the diameter of the dam 210' is smaller than the diameter of the dam-forming portion 200', the solvent can pass by the side surface of the dam 210', and therefore the dam-forming portion may not need a protruded portion. In this case, a solvent inlet 250', which is the inlet of the space through which the solvent flows between the side surface of the dam 210' and the inner surface of the dam-forming portion 200', has a width smaller than the diameter of the filler 400.

Referring to FIG. 1a again, as described above, the inlet 100 and the outlet 300 may be connected to the dam-forming portion 200 and formed integrally with the dam-forming portion 200. Each of the inlet 100 and the outlet 300 may have a long cylindrical shape, for example. In addition, each of the inlet 100 and the outlet 300 may be located on the same line with respect to the center axis in a longitudinal direction of the dam-forming portion 200. The diameter of each of the inlet 100 and the outlet 300 is smaller than the diameter of the dam-forming portion 200.

A size of the micro device for solid phase extraction 10, for example, as shown in FIG. 1b, a diameter of the micro device for solid phase extraction 10 (i.e., a diameter of the micro device 10 including the protruded portion 240 of the dam-forming portion 200) may be 25 mm to 32 mm, and a total length of the micro device for solid phase extraction 10 (i.e., a total length of the micro device including the inlet 100, the dam-forming portion 200 and the outlet 300) may be about 10.3 mm to 10.45 mm, and in one embodiment may be about 10 mm. A diameter of the filler 400 may be 35 μm to 60 μm. A diameter of the inlet 100 may be 0.5 mm to 10 mm, and a length of the inlet 100 may be about 5 mm. A diameter of the outlet 300 may be 0.5 mm to 10 mm, and a length of the outlet 300 may be about 5 mm. A length from the first end portion 220 of the dam-forming portion 200 to the rear portion of the dam 210 (i.e., a length of the region in which the filler 400 can be filled) may be 0.2 mm to 0.3 mm. A length from the rear portion of the dam 210 to the second end portion 230 may be 100 μm to 150 μm. A length of the dam 210 may be 30 μm to 35 μm. A width of the solvent inlet 250 of the protruded portion 240 may be 30 μm to 35 μm to prevent the filler 400 from passing through. The dimensions shown in FIG. 1b are merely examples, and the present invention is not limited thereto, and various modifications and changes may be made according to the various environments in which the present invention is implemented.

The filler 400 in the dam-forming portion 200 is blocked by the dam 210 and could not exit toward the outlet 300, and therefore the filler 400 may be filled in the rear of the dam 210. As shown in FIG. 2, the filler 400 may be filled in the form of disk in the rear of the dam 210, depending on the flow of the solvent. The filling shape of the filler 400 is shown in FIG. 2 as 200a.

According to the present invention, since the same filling distance of the filler 400 from the central axis in the longitudinal direction of the dam-forming portion 200 generates a similar differential pressure, a uniform flow distribution of the solvent in the micro device for solid phase extraction 10 can be achieved. Therefore, the dam-forming portion 200 and the dam 210 are designed to be radially symmetric (cylindrical) from the central axis so that the fillers 400 are filled at the same distance. Accordingly, the shape of the region 200a filled with the filler 400 becomes a disk shape as shown in FIG. 2, and the inlet 100 and the outlet 300 are located on the central axis. That is, each of the dam-forming portion 200 and the dam 210 has a circular cross section perpendicular to the central axis in the direction in which the inlet 100 extends. In the dam-forming portion 200, the filler 400 is filled in the form of disk with respect to the central axis. As such, when the cross section has a circular shape, the filler 400 is formed in the fluid flow direction with the same distribution from the central axis of the micro device for solid phase extraction 10, thereby eliminating unnecessary volume of the micro device for solid phase extraction 10 and maximizing the efficiency of solid phase extraction.

It will be understood by those skilled in the art that various changes in form and details may be made therein without departing from the spirit and scope of the invention as defined by the appended claims. Therefore, it should be understood that the above-described embodiments are illustrative in all aspects and not restrictive. In addition, the scope of the present invention is indicated by the following claims rather than the above detailed description. Also, all changes or modifications derived from the meaning and scope of the claims and their equivalents should be construed as being included within the scope of the present invention.

DESCRIPTION OF SYMBOLS

| | |
|---|---|
| 10: Micro device for solid phase extraction | |
| 100: Inlet | 200: Dam-forming portion |
| 210: Dam | 220: First end portion |
| 230: Second end portion | 240: Protruded portion |
| 250: Solvent inlet | 300: Outlet |
| 400: Filler | |

What is claimed is:

1. A micro device for solid phase extraction comprising:
an inlet configured to receive injection of a solvent and a filler;
an outlet configured to receive discharging of the solvent; and
a dam-forming portion located between the inlet and the outlet, the dam-forming portion having a first end portion adjacent to the inlet and a protruded portion adjacent to the outlet, the protruded portion having a diameter greater than a diameter of the first end portion, the protruded portion having a circular, cylindrical, or conical cross section; and
a dam disposed within the protruded portion of the dam-forming portion, the dam configured to allow the solvent to flow therethrough but configured to prevent the filler from passing therethrough,
wherein each of the dam-forming portion and the dam has a circular cross section with respect to a central axis of the micro device, the central axis extending in a longitudinal direction of the inlet in which the inlet extends, each cross section being perpendicular to the central axis, and wherein the dam-forming portion is configured to accommodate the filler thereon, the filler configured to be deposited onto the dam in the form of a disk that is centered with respect to the central axis in the dam-forming portion, the filler having a minimum diameter, and
wherein a gap is defined between an outer peripheral edge of a top surface of the dam and a transition edge at which the first end portion meets the protruded portion, the gap being less than or equal to the minimum diameter of the filler.

2. The micro device according to claim 1, wherein each of the inlet and the outlet has a circular cross section with respect to the central axis, the cross section of each of the inlet and the outlet being perpendicular to the central axis, and wherein a diameter of the inlet and a diameter of the outlet are each smaller than a diameter of the dam-forming portion.

3. The micro device according to claim 1, wherein the dam-forming portion has a first end portion connected to the inlet and a second end portion connected to the outlet, the first and second end portions being at opposite ends of the dam-forming portion, and wherein the dam is located closer to the second end portion than the first end portion, and the dam is spaced apart from the second end portion by a predetermined distance.

4. The micro device according to claim 3, wherein each of the second end portion and a portion of the dam facing the second end portion has a respective surface protruding toward the outlet.

5. The micro device according to claim 4, wherein the surface of the second end portion and the surface of the portion of the dam each have a conical shape.

6. The micro device according to claim 1, wherein the filler is in the form of beads.

7. The micro device according to claim 1, wherein a total diameter of the micro device in a plane perpendicular to the longitudinal direction is 25 mm to 32 mm and a total length of the micro device in the longitudinal direction is 10 mm.

8. The micro device according to claim 7, wherein a diameter of particles of the filler is from 35 µm to 60 µm, a diameter of the inlet is 0.5 mm to 10 mm and a length of the inlet is 5 mm, a diameter of the outlet is 0.5 mm to 10 mm and a length of the outlet is 5 mm, a distance from a first end portion of the dam-forming portion to a surface of the dam facing the first end portion is 0.2 mm to 0.3 mm, a distance from the surface of the dam facing the first end portion to a second end portion of the dam-forming portion is 100 µm to 150 µm, and a thickness of the dam in the longitudinal direction is 30 µm to 35 µm.

* * * * *